(12) United States Patent
Savo

(10) Patent No.: US 9,239,914 B2
(45) Date of Patent: Jan. 19, 2016

(54) METHOD FOR SETTING UP AN ACCESS LEVEL FOR USE OF A SOFTWARE SYSTEM, AND COMPUTER PROGRAM PRODUCTS AND PROCESSOR DEVICES THEREOF

(71) Applicant: ABB Research Ltd., Zurich (CH)

(72) Inventor: Isak Savo, Vasteras (SE)

(73) Assignee: ABB Research Ltd., Zurich (CH)

( * ) Notice: Subject to any disclaimer, the term of this patent is extended or adjusted under 35 U.S.C. 154(b) by 62 days.

(21) Appl. No.: 13/888,004

(22) Filed: May 6, 2013

(65) Prior Publication Data
US 2013/0247156 A1     Sep. 19, 2013

Related U.S. Application Data

(63) Continuation of application No. PCT/EP2011/069093, filed on Oct. 31, 2011.

(60) Provisional application No. 61/411,328, filed on Nov. 8, 2010.

(30) Foreign Application Priority Data

Apr. 6, 2011 (EP) .................... 11161349

(51) Int. Cl.
 *G06F 21/30* (2013.01)
 *G06F 21/31* (2013.01)
 (Continued)

(52) U.S. Cl.
 CPC ............ *G06F 21/30* (2013.01); *G06F 21/31* (2013.01); *G06F 21/32* (2013.01); *G06F 21/40* (2013.01);
 (Continued)

(58) Field of Classification Search
 CPC ....... G06F 21/30; G06F 21/31; G06F 21/604; G06F 2221/2113; G06F 2221/2141; H04L 63/08; H04L 63/10; H04L 63/083; H04L 63/101; H04L 63/0815
 USPC ...................................... 726/2, 4, 17, 26–30
 See application file for complete search history.

(56) References Cited

U.S. PATENT DOCUMENTS 6,892,307 B1  5/2005 Wood et al.
7,734,690 B2  6/2010 Moromisato et al.
(Continued)

FOREIGN PATENT DOCUMENTS

EP  1965327 A1  9/2008

OTHER PUBLICATIONS

Christopher Negus: "Becoming Super User (The su Command)"; In: Fedora 10 and Red Hat Enterprise Linux Bible; Jan. 27, 2009 Section 10.2; 3 pages.
(Continued)

*Primary Examiner* — Joseph P Hirl
*Assistant Examiner* — Kalish Bell
(74) *Attorney, Agent, or Firm* — Whitmyer IP Group LLC

(57) ABSTRACT

A method for setting up an access level for use of a software system including different levels of user accesses. The method includes the steps of: using a first user login to log in to the software system, the first user login having a first access level including a first set of permissions; using a second user login to log in to the software system, the second user login having a second access level including a second set of permissions; and combining the permissions of the first set of permissions and the second set of permissions in the software system, thereby setting up the access level for the use of the software system, the access level including the combined permissions of the first set of permissions and the second set of permissions. The invention also relates to computer program products and processor means.

16 Claims, 2 Drawing Sheets

(51) Int. Cl.
  *G06F 21/40* (2013.01)
  *G06F 21/62* (2013.01)
  *G06F 21/32* (2013.01)

(52) U.S. Cl.
  CPC .... *G06F 21/6218* (2013.01); *G06F 2221/2113* (2013.01); *G06F 2221/2141* (2013.01); *G06F 2221/2145* (2013.01)

(56) References Cited

U.S. PATENT DOCUMENTS

| | | | | |
|---|---|---|---|---|
| 2001/0047279 | A1* | 11/2001 | Gargone | 705/1 |
| 2003/0007782 | A1* | 1/2003 | Kamen | 386/83 |
| 2004/0073789 | A1* | 4/2004 | Powers | 713/165 |
| 2006/0026672 | A1* | 2/2006 | Braun | 726/9 |
| 2006/0156384 | A1* | 7/2006 | Minium et al. | 726/2 |
| 2007/0266423 | A1* | 11/2007 | Tehee, Jr. | 726/3 |
| 2008/0275971 | A1 | 11/2008 | Pretlove et al. | |
| 2009/0085871 | A1 | 4/2009 | Bhogal et al. | |
| 2009/0112374 | A1* | 4/2009 | Kirchhof et al. | 700/287 |
| 2010/0186084 | A1 | 7/2010 | Hamid | |
| 2010/0211884 | A1 | 8/2010 | Kashyap et al. | |

OTHER PUBLICATIONS

European Search Report Application No. EP 11 16 1349 Completed: Jan. 9, 2012; Mailing Date: Jan. 18, 2012 7 pages.
International Preliminary Report on Patentability Application No. PCT/EP2011/069093 Completed: Mar. 11, 2013 14 pages.
International Search Report and Written Opinion of the International Searching Authority Application No. PCT/EP2011/069093 Completed: Jan. 9, 2012; Mailing Date: Jan. 18, 2012 10 pages.
Written Opinion of the International Preliminary Examining Authority Application No. PCT/EP2011/069093 Mailing Date: Nov. 6, 2012 7 pages.
Christopher Negus: "Working with a Linux File System"; In: Fedora 10 and Red Hat Enterprise Linux Bible; Jan. 27, 2009 Section 4.4.2.4; 11 pages.

* cited by examiner

METHOD FOR SETTING UP AN ACCESS LEVEL FOR USE OF A SOFTWARE SYSTEM, AND COMPUTER PROGRAM PRODUCTS AND PROCESSOR DEVICES THEREOF

FIELD OF THE INVENTION

The present invention relates generally to the field of software systems, and in particular to multi-user log in to such software systems.

BACKGROUND OF THE INVENTION

In a typical multi-user software system different users have access to different types of information and are able to perform different types of actions. Permissions may for example be granted based on the work description of the particular user. As a few examples, an administrator could be permitted to access all information and perform any action in the system, a human resource representative should be permitted to perform personnel tasks and view salaries and similar matters, an employee at a finance department should be permitted to access financial records and make budget reports, a visitor or guest may be permitted to have only a read-only access to information and no access at all to sensitive information etc.

However, using the above approach entails some drawbacks. It sometimes happens that a particular work task requires information or actions of several of the above exemplified types of roles, and thus their respective permissions. In order to solve this work task, the different users, having their particular access rights, could do the parts of the work task that they have permissions for. That is, the different users do their own tasks related to the work task separately from each other, after which the result is somehow merged in the end. Obviously, such solution is inefficient and less than optimal.

Another way of solving the work task could be to create a new special user with a login having the combined permissions needed to perform the work task. However, to create such special user permissions each time a work task requires the permissions of different user categories is also very inefficient and most likely also needing an administrator creating the special user login.

In view of the above, there is a need for a more flexible solution in this regards.

SUMMARY OF THE INVENTION

In view of the above, it is a general object of the invention to provide methods and means for allowing multiple users simultaneous access to a particular software system.

In accordance with the invention, a method for setting up an access level for use of a software system comprising different levels of user accesses is provided. The method comprises the steps of: using a first user login to log in to the software system, the first user login having a first access level comprising a first set of permissions; using a second user login to log in to the software system, the second user login having a second access level comprising a second set of permissions; and combining the permissions of the first set of permissions and the second set of permissions in the software system, thereby setting up the access level for the use of the software system, the access level comprising the combined permissions of the first set of permissions and the second set of permissions. By means of the invention a method is provided allowing users to work collaboratively and effectively by allowing simultaneous logins to the same software system.

In an embodiment, the first user login comprises using a first user name and a first password, and the second user login comprises using a second user name and a second password. This is a familiar way of authenticating a user before allowing him or her access to the software system. Thus, when implementing the present method, a login procedure that the users are accustomed to may be used. In other embodiments, the first user login and the second user login comprises using a respective identification card or a biometric authentication device.

In another embodiment, the method comprises a further step of, after completion of the step of using a first user login, clicking on a button to thereby make available a login procedure for the step of using a second user login. A rapid way of providing the desired access level is thereby enabled, and this can further be easily implemented.

In yet another embodiment, the software system comprises one of: an operative system of a computer, a control system for controlling a power plant, a control system for controlling a process, an economy program. Numerous of users of different software systems may thus benefit from the present invention.

In another embodiment, the first set of permissions comprises access to a first set of computer programs and/or information, and the second set of permissions comprises access to a second set of computer programs and/or information.

In yet another embodiment, the step of combining the permissions of the first set of permissions and the second set of permissions in the software system comprises taking the union thereof. The combined access levels comprising the first and second set of permissions can now be accessed simultaneously by the first and second user.

In still another embodiment, the set of permissions comprises permission levels within a particular computer program.

The invention also encompasses computer program products and processor devices.

Further features and advantages thereof will become clear upon reading the following description together with the accompanying drawings.

DETAILED DESCRIPTION OF THE INVENTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Briefly, the present invention provides a method for allowing multiple, simultaneous logins, with a permission level that is a combination of the permissions of all participants.

Figure 1:
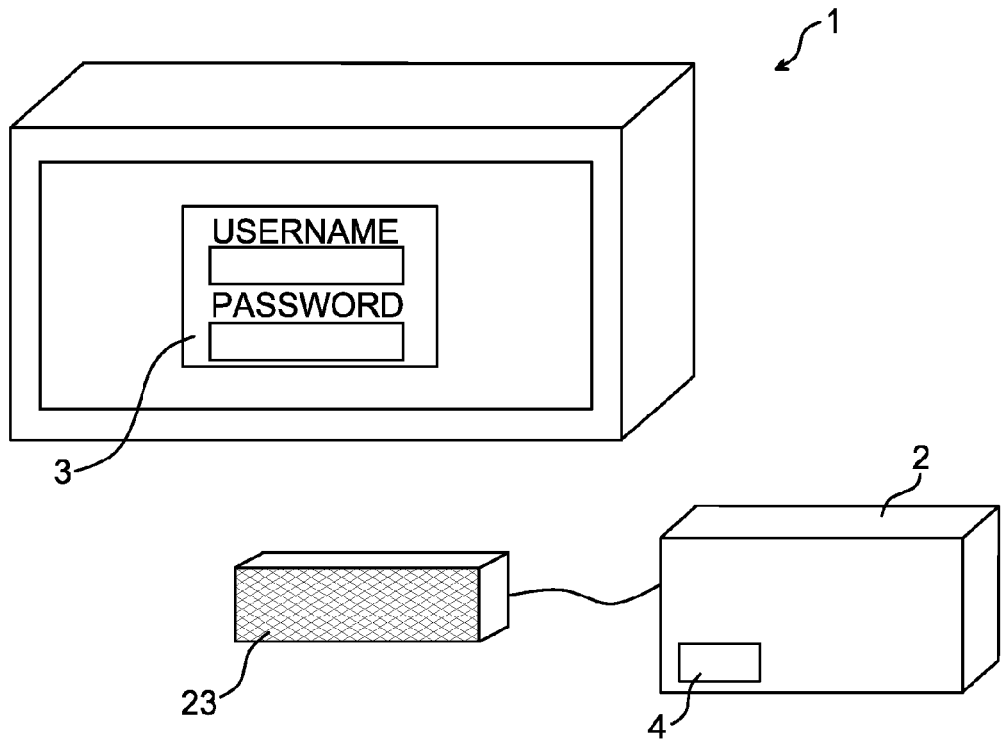
FIG. 1 illustrates a computer and a display unit.

FIG. 1 illustrates a display unit 1 connected to a computer 2. The display unit 1 has a screen showing a screen view comprising a user login means 3. The computer 2 may also be connected to or comprise an input device 23, such as a keyboard.

As a first particular example and with reference to FIG. 1, a first user logs in to an operative system of the computer 2 by entering his user name and password using the input device 23. The first user has a first access level including a first set of permissions. The first set of permissions may for example comprise the use of two particular programs, program A and program B, installed on the computer 2 or in some other available through the operative system.

A second user then logs in to the same operative system of the same computer 2 by entering his user name and password. The second user has a second access level including a second set of permissions. The second set of permissions may for example comprise the use of program A and program C.

The set of permissions may comprise the permission levels within a particular program D. For example, the first user may have the permission only to add information, while the second user has the permission to add information, to delete information and to change information. Such permission levels within a program may comprise any type of operations performed within the program, obviously depending on the program in question. The read, write, delete example above being only an example thereof.

The first and second users are then both logged in to the operative system with their respective sets of permissions now available simultaneously. In particular, the first and second users now have access to programs A, B and C and may cooperate in order to solve a particular work task.

It is noted that the user login means 3 is just used as an exemplifying illustration. The users may use any login procedure, for example using biometric authentication such as using fingerprints, eye or face recognition as the login procedure. Yet another example comprises the use of identity cards. It is thus realized that several alternative login procedures can be used.

When the first user has logged in to the operative system, the login procedure of the second user comprises, in an embodiment of the invention, clicking on a dedicated login button in order to get a login window in which he may enter his user name and password. In another embodiment, when the software system is an operative system, there may be a button in the start menu, e.g. a button defining "Log in further user", allowing a second user to log in. Buttons in a toolbar of a computer program is yet another example. As yet another example, if the users log in by using identification cards, then the simple act of each user e.g. passing their respective identification cards through a reader/authentication device would suffice. In still another example, a fingerprint scanner device is used for login, and each user then just uses the scanner device in order to log in.

Figure 2:
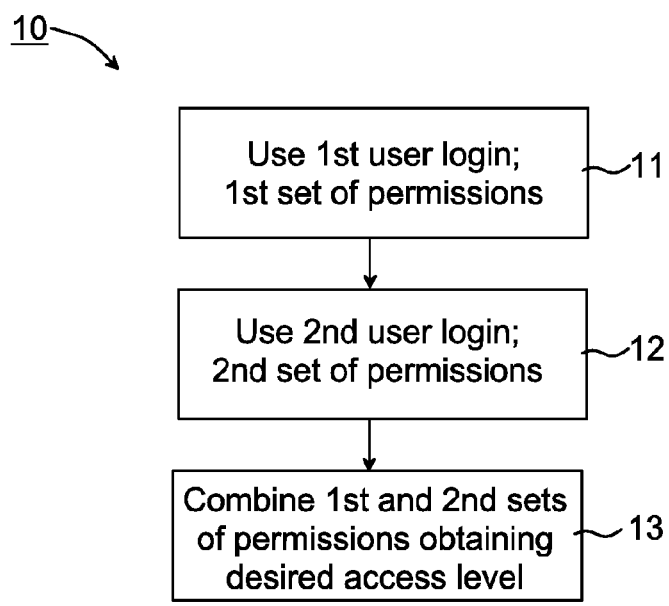
FIG. 2 illustrates a flow chart over steps of a method in accordance with an embodiment.

With reference to FIG. 2, a method is presented for setting up an access level for use of a software system. The software system comprises different levels of user accesses.

The method 10 comprises a first step 11 of using a first user login to log in to the software system, wherein the first user login has a first access level comprising a first set of permissions.

The method 10 comprises a second step 12 of using a second user login to log in to the software system, wherein the second user login has a second access level comprising a second set of permissions.

The method 10 comprises the third step 13 of combining the permissions of the first set of permissions and the second set of permissions in the software system. Thereby the desired access level for the use of the software system is set up, wherein the desired access level comprises the combined permissions of the first set of permissions and the second set of permissions.

In an embodiment of the method, the first user login comprises using a first user name and a first password, and the second user login comprises using a second user name and a second password. This is a common way of authenticating a user before allowing him or her access to the software system. Thus, when implementing the present method, a login procedure that is familiar to the users may be used. However, as mentioned earlier, alternative login procedures may be used.

In an embodiment of the method, the method comprises a step of, after completion of the step of using a first user login, clicking on a button to thereby make available a login procedure for the step of using a second user login. That is, as soon as the first user has logged in to the software system, he or she may press a button and thereby enable a second user to repeat the log in procedure using his or hers login details. A rapid and easily implemented way of providing the desired access level is thereby enabled. In particular, the function of providing a login procedure by pressing a particular button may easily be programmed and thus implemented.

Examples of software systems which the multiple users may be logged in to comprise: an operative system of a computer; a control system for supervising and controlling a power plant, a process industry or the like; an economy software program comprising different user access levels; an e-mail and/or calendar program; Software Configuration Management systems; document database; information database; websites and/or single webpages accessible through for example Internet or a local area network. It is realized that the invention may be implemented in and/or for any software system requiring authentication, e.g. by means of a login procedure requiring user name and password. The software system further comprises different access levels, for example meaning that different users have access to different sets of permissions, e.g. access to different programs or different information.

In an embodiment, the first set of permissions comprises access to a first set of computer programs and/or information, and the second set of permissions comprises access to a second set of computer programs and/or information.

In an embodiment, the set of permissions comprises permission levels within a particular computer program. That is, the first user has a first set of permissions comprising particular permission levels (access levels) within a program (e.g. permission to read, write, alter, delete information). The second user has a second set of permissions comprising particular permission levels within the same program (e.g. permission only to read information).

In an embodiment, the step of combining the permissions of the first set of permissions and the second set of permissions in the software system comprises taking the union thereof. This will be described more in detail in the following.

An algorithm to determine the combined permission level comprises taking the union of all permissions contributed by the logged in participants. In set theory, the union of a collection of sets is the set of all distinct elements in the collection. If for example user A has a set of permissions comprising {1, 2} and user B has a set of permissions comprising {3, 4}, the effective permission level of the system when both A and B are logged in would be {1, 2, 3, 4}. If user C also logs in, having a set of permissions comprising {2, 3, 5}, then the effective permission level would be {1, 2, 3, 4, 5}.

Figure 3:
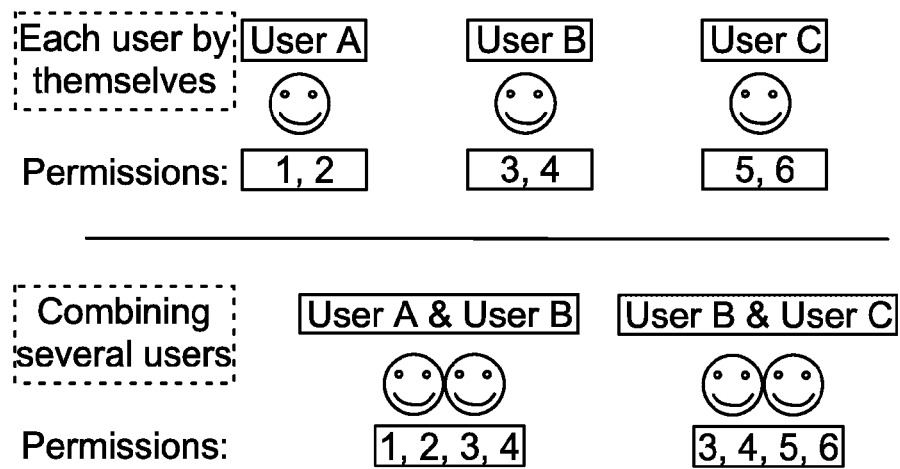
FIG. 3 illustrates different sets of permissions.

With reference now to FIG. 3, a second example of the above is illustrated. User A has permissions 1, 2, user B has permissions 3, 4 and user C has permissions 4, 5, 6. If user A and user B both logs in having their respective permissions, the combined permissions would be 1, 2, 3, 4. If user B and user C logs in, their combined permissions would comprise 3, 4, 5, 6.

As a particular example, multiple users can simultaneously access a control system used for controlling a power plant, e.g. SCADA (Supervisory Control And Data Acquisition). At a meeting in which events that have happened during the day or week are discussed, several users log in to the control system. Much of the information is typically retrieved from the control system, but all this information is not necessarily accessible by any single participant. As multiple users are logged in to the control system, all information may be retrieved much faster and easier.

As yet another example, if both a human resource representative and a controller from a finance department are working on a task, they can both log in and the software system grants them access to both human resource information as well as finance information at the same time.

By means of the invention a number of users may log in to the same software system using their own login details (e.g. user name and password). They may thereby work more effectively in order to rapidly, and in particular much faster than in known prior art methods, solve their work tasks. The invention allows users to work in a collaborative manner in order to achieve results.

Many software solutions have a strong requirement on user authentication and authorization and could benefit from the more flexible login system provided by the present invention.

With reference again to FIG. 1, the invention also encompasses a computer program product 4 for setting up an access level for use of the software system comprising different levels of user accesses. The computer program product 4 comprises computer readable means carrying computer program code, the program code being configured to:
  accept a first user login to log in to the software system, the first user login having a first access level comprising a first set of permissions,
  accept a second user login to login to the software system, the second user login having a second set of permissions,
  combine the permissions of the first set of permissions and the second set of permissions in the software system, thereby setting up the access level for the use of the software system, the access level comprising the combined permissions of the first set of permissions and the second set of permissions.

When accepting a user login, the corresponding set of permissions is retrieved, and when combining the permissions the union thereof is preferably provided. When logging in to a software system, the permissions for the logged in person are retrieved from e.g. a software program. This software program could comprise program code of the software system which the person is logging into, or it could comprise a separate software program. The permissions for the logged in person have been entered beforehand, in conventional manner.

The invention further encompasses a processor device, for example the computer 2, for setting up an access level for use of the software system comprising different levels of user accesses. The processor device 2 comprises means for carrying out the method as described earlier.

As a particular example, in a software system such as the earlier mentioned control system that is used for controlling a power plant, e.g. SCADA (Supervisory Control And Data Acquisition), the setting up of an access level can be implemented as program code within the control software system.

Figure 4:
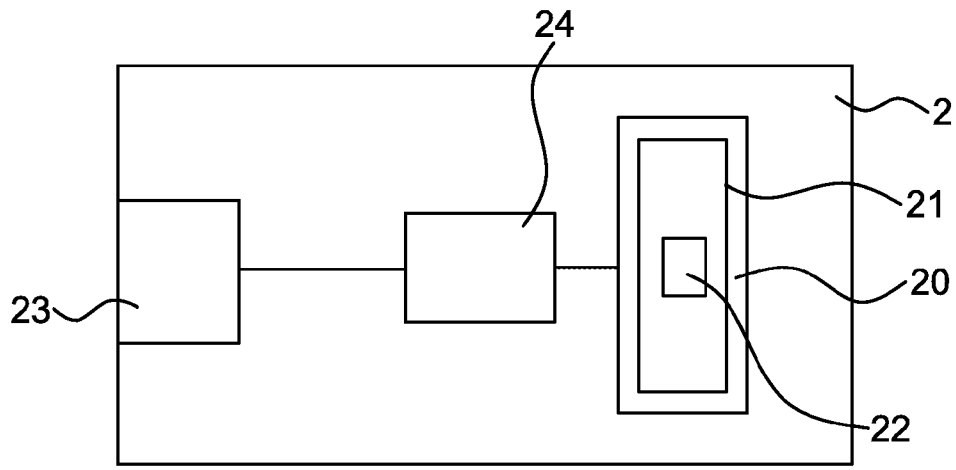
FIG. 4 illustrates a computer program and computer program product of the computer of FIG. 1.

With reference now to FIG. 4, the setting up an access level for use of a software system comprising different levels of user accesses, can thus be implemented as a program module 22 of a computer program 21 comprising code means which when run by a processor 24 in the computer 2 causes the computer 2 to perform the above-described functions and actions. The program module 22 can be implemented as a program module of the computer program 21 comprising code means which when run by the processor 24 causes the computer 2 to perform the above-described functions and actions.

The processor 24 is typically able to receive user input from the input device 23, for example user log in particularities input by the user. However, as discussed earlier, there are numerous ways that a user can log in to the software system, and the input device 23 may be the earlier mentioned keyboard or some other input device such as a card reader.

The processor 24 may be a single CPU (central processing unit), but could comprise two or more processing units in the computer 2. For example, the processor 24 may comprise general purpose microprocessors, instruction set processors and/or related chips sets and/or special purpose microprocessors, such as ASICs (application specific integrated circuits). The processor 24 may also comprise board memory for caching purposes.

The computer program 21 may be carried by a computer program product 20 in the computer 2 connected to the processor 24. The computer program product 20 comprises a computer readable medium on which the computer program 21 is stored. For example, the computer program product 20 may be a flash memory, a RAM (Random-access memory), ROM (Read-Only memory) or an EEPROM (Electrically Erasable Programmable ROM), and the computer program modules described above could in alternative embodiments be distributed on different computer program products in the form of memories within the computer 2. The computer program product 20 may an optical disc, such as a CD (compact disc) or a DVD (digital versatile disc) or a Blu-Ray disc.

The computer program 21 for setting up an access level for use of a software system comprising different levels of user accesses is thus also provided. The computer program 21 comprises computer program code (e.g. program module 22) which when run on the processor 24 of the computer 2 causes the computer 2 to: accept a first user login to log in to the software system, the first user login having a first access level comprising a first set of permissions; accept a second user login to login to the software system, the second user login having a second set of permissions; and combine the permissions of the first set of permissions and the second set of permissions in the software system, thereby setting up the access level for the use of the software system, the access level comprising the combined permissions of the first set of permissions and the second set of permissions.

It is noted that the invention is not restricted to a particular number of users logging in to the software system. Although the invention has been described using only a few number of users, any number of users can be logged into the software system, for example several hundred users or thousands.

What is claimed is:

1. A method for setting up an access level for use of a software system comprising different levels of user accesses, the method comprising the steps of:

using a first user login for a first user to log in to the software system, the first user login having a first access level comprising a first set of permissions for control of the software system, using a second user login for a second user to log in to the software system, the second user login having a second access level comprising a second set of permissions for control of the software system, combining the permissions of the first set of permissions and the second set of permissions in the software system, thereby setting up the access level for the use of the software system, the access level comprising the combined permissions of the first set of permissions and the second set of permissions allowing the first and second users to access programs or retrieve information from the control system with their respective sets of permissions now available simultaneously, wherein the software system comprises a control system for controlling a power plant, each permission in the first and second sets of permissions controls an operation of the control system for controlling the power plant, the access levels of each permission comprising read only and alter, and a first work task using the control system for controlling the power plant requires a permission that is in the first set of permissions but is not in the second set of permissions, and a second work task using the control system for controlling the power plant requires a permission that is in the second set of permissions but is not in the first set of permissions, the first and second work tasks able to be performed simultaneously to control the power plant using the combined permissions.

2. The method as claimed in claim 1, wherein the first user login comprises using a first user name and a first password, and the second user login comprises using a second user name and a second password; or the first user login and the second user login comprises using a respective identification card; or the first user login and the second user login comprises using a biometric authentication device.

3. The method as claimed in claim 1, comprising a step of, after completion of the step of using a first user login, clicking on a button to thereby make available a login procedure for the step of using a second user login.

4. The method as claimed in claim 1, wherein the software system comprises one of: an economy program, an e-mail or calendar program; Software Configuration Management systems; document database; information database; websites or single webpages.

5. The method as claimed in claim 1, wherein the first set of permissions comprises access to a first set of computer programs or information, and the second set of permissions comprises access to a second set of computer programs or information.

6. The method as claimed in claim 1, wherein the step of combining the permissions of the first set of permissions and the second set of permissions in the software system comprises taking the union thereof.

7. The method as claimed in claim 5, wherein the first set of permissions and the second set of permissions comprise permission levels within a particular computer program.

8. A computer program product for setting up an access level for use of a software system comprising different levels of user accesses, the computer program product comprising computer program code stored on non-transitory computer readable media and executing on a processor of a computer to cause the computer to:

accept a first user login for a first user to log in to the software system, the first user login having a first access level comprising a first set of permissions for control of the software system, accept a second user login for a second user to login to the software system, the second user login having a second set of permissions for control of the software system, and combine the permissions of the first set of permissions and the second set of permissions in the software system, thereby setting up the access level for the use of the software system, the access level comprising the combined permissions of the first set of permissions and the second set of permissions allowing the first and second users to access programs or retrieve information from the control system with their respective sets of permissions now available simultaneously, wherein the software system comprises a control system for controlling a power plant, each permission in the first and second sets of permissions controls an operation of the control system for controlling the power plant, the access levels of each permission comprising read only and alter, and a first work task using the control system for controlling the power plant requires a permission that is in the first set of permissions but is not in the second set of permissions, and a second work task using the control system for controlling the power plant requires a permission that is in the second set of permissions but is not in the first set of permissions, the first and second work tasks able to be performed simultaneously to control the power plant using the combined permissions.

9. A processor device for setting up an access level for use of a software system stored on non-transitory computer readable media comprising different levels of user accesses, the processor device comprising:

a hardware processor having the software system executing thereon, a first user login for a first user to log in to the software system, the first user login having a first access level comprising a first set of permissions for control of the software system, a second user login for a second user to log in to the software system, the second user login having a second access level comprising a second set of permissions for control of the software system, wherein the permissions of the first set of permissions and the second set of permissions are combined in the software system, thereby setting up the access level for the use of the software system, the access level comprising the combined permissions of the first set of permissions and the second set of permissions allowing the first and second users to access programs or retrieve information from the control system with their respective sets of permissions now available simultaneously, the software system comprises a control system for controlling a power plant, each permission in the first and second sets of permissions controls an operation of the control system for controlling the power plant, the access levels of each permission comprising read only and alter, and a first work task using the control system for controlling the power plant requires a permission that is in the first set of permissions but is not in the second set of permissions, and a second work task using the control system for controlling the power plant requires a permission that is in the second set of permissions but is not in the first set of permissions, the first and second work tasks able to be performed simultaneously to control the power plant using the combined permissions.

10. The method as claimed in claim 1, wherein the different levels of user accesses comprise: read only, alter, and delete.

11. The method as claimed in claim 5, wherein the first set of permissions comprises access to a first set of computer programs, and the second set of permissions comprises access to a second set of computer programs, at least one computer program in the second set of computer programs is not in the first set of computer programs.

12. The method as claimed in claim 1, wherein the software system comprises an operative system of a computer.

13. The method as claimed in claim 1, wherein the access level allows the first and second users to access programs in order to solve work tasks in a collaborative manner.

14. The method as claimed in claim 1, wherein the software system comprises a Supervisory Control And Data Acquisition system used to perform the first and second work tasks to control the power plant, the performance of the first and second work tasks based on information retrieved from the Supervisory Control And Data Acquisition system, retrieval of the information requiring both the first and second permissions.

15. The method as claimed in claim 1, wherein the software system comprises at least one of: an economy program; a calendar program.

16. The method as claimed in claim 1, wherein the software system comprises a calendar program.

* * * * *